(12) United States Patent
Heller et al.

(10) Patent No.: US 6,396,539 B1
(45) Date of Patent: May 28, 2002

(54) CMOS IMAGING DEVICE WITH INTEGRATED DEFECTIVE PIXEL CORRECTION CIRCUITRY

(75) Inventors: Jack Heller, Mesa; James Breisch, Chandler, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/032,750

(22) Filed: Feb. 27, 1998

(51) Int. Cl.[7] ............................ H04N 9/64; H04N 5/217
(52) U.S. Cl. ......................................... 348/246; 348/341
(58) Field of Search ............................... 348/241, 246, 348/247

(56) References Cited

U.S. PATENT DOCUMENTS 5,392,070 A * 2/1995 Endo et al. ................. 348/247
5,436,659 A * 7/1995 Vincent ..................... 348/246
5,883,830 A * 3/1999 Hirt et al.

* cited by examiner

Primary Examiner—Wendy R. Garber
Assistant Examiner—Rashawn N Tillery
(74) Attorney, Agent, or Firm—Blakely, Sokoloff, Taylor & Zafman LLP

(57) ABSTRACT

What is disclosed is a single integrated circuit having an image sensor for outputting signals representative of input light; a programmable non-volatile memory for storing defective pixel location information; a controller unit for interfacing with the programmable non-volatile memory and accessing the defective pixel location information; and a input/output port for communicating with control and post-processing circuitry.

6 Claims, 6 Drawing Sheets

CMOS IMAGING DEVICE WITH INTEGRATED DEFECTIVE PIXEL CORRECTION CIRCUITRY

BACKGROUND OF THE INVENTION

1. Field of the Invention

The invention generally relates to imaging devices and particularly to integrated circuit imaging devices requiring compensation for process and other variations.

2. Description of Related Art

Integrated circuit imaging devices include an array of light detecting elements interconnected to generate analog signals representative of an image illuminating the device. One common example of an integrated circuit imaging device is a charge coupled device (CCD) which is relatively expensive and consumes a relatively large amount of power. An alternative integrated circuit imaging device employs complementary metal oxide semiconductor (CMOS) image sensing elements. Within such an integrated circuit, a CMOS photo-diode or photo-transistor is employed as a light detecting element.

In one example, conductivity of the element varies in accordance with the intensity of light illuminating the element. In another example, charge is collected in accordance with the intensity of light illuminating the element. By conducting current through the element or storing charge, an analog signal is generated having a magnitude approximately proportional to the intensity of light illuminating the element. CMOS integrated circuit imaging devices are considerably cheaper than CCD-type devices and may consume less power.

By having an array of these sensors, and image can be formed by reading the light intensity measured by the sensors, and reconstructing the image on a display device. The captured image can also be output to a printer or other output device.

In security applications, images often need to be authenticated in terms of the source of the images and the validity of the image (i.e., the image being identifiable from a particular sensor and not being edited from the original capture). Thus, order to ensure an image's authenticity, the identity of source of the image must be unequivocally determinable. In addition, this allows an image, even if it has been modified, to be traceable to an original source.

Typically, such systems include, in addition to the integrated circuit imaging array, a separate controller circuit and a separate image processing logic circuit. The controller circuit controls the storage of the security/identification values and the application of those values for security/identification purposes. The controller may also provide timing signals for the proper clocking of the imaging array. The image processing logic may include, for example, logic for filtering the image or otherwise manipulating the image to perform pattern recognition and the like.

Thus, typical integrated circuit imaging devices often include separate integrated circuits for the imaging array, the controller and the image processing logic. The provision of separate integrated circuits for the various components, and corresponding separate packaging elements, results in a fairly high cost for the overall system. Each integrated circuit has to be tested individually, and also tested after they are mounted on a circuit board. If the assembled circuit board is determined to be defective, then the entire circuit board must be repaired or replaced.

Sensors are not identifiable when they are being manufactured. The security/identification values are assigned after the complete system is manufactured, resulting in an additional step in manufacturing that also adds to the cost of manufacture. There is also an administrative burden on keeping track of defective pixel information before an identification number is assigned as the sensor and the defective pixel information related to the pixel must be physically tracked throughout the manufacturing process. If a sensor is somehow misplaced in the manufacturing sequence, then the integrated circuit imaging array, and all the other integrated circuit imaging array that are mis-sequenced, have to be re-tested.

Moreover, the separation of the controller from the integrated circuit imaging array allows tampering of the security/identification values assigned to the imaging array. For example, a miscreant can replace the controller, and therefore, the security/identification values, associated with the array, thereby defeating the integrity of the system.

Currently, a certain number of defective pixels per sensor is tolerated so that a given amount of sensors are deemed usable and manufacturing costs are recovered. In these sensors, pixels that are found to be defective do not exceed a predetermined number for the entire sensor nor do they exceed a predetermined number within a predetermined area. Although the locations of these pixels are discovered during testing, it is an administrative burden, as described above, to keep track of this information during manufacture. More importantly, ensuring that information about defective pixels are supplied with each sensor after manufacture adds to the cost of sensor production. For example, the company that manufactures the sensor must provide the company that manufactures the camera with defective pixel information. Most often, the defective pixel information is provided a separate media (e.g., a floppy disc, a computer-readable tape, or other computer-readable storage media), which adds to costs. And again, problems arise with matching each sensor with its defective pixel information.

It would be desirable to provide an improved integrated circuit imaging system which overcomes these disadvantages.

SUMMARY OF THE INVENTION

A single integrated circuit having an image sensor for outputting signals representative of input light; a programmable non-volatile memory for storing defective pixel location information; a controller unit for interfacing with the programmable non-volatile memory and accessing the defective pixel location information; and a input/output port for communicating with control and post-processing circuitry.

DETAILED DESCRIPTION OF THE INVENTION

With reference to the remaining figures, exemplary embodiments of the invention will now be described. The exemplary embodiments are described primarily with reference to block diagrams and flowcharts. As to the flowcharts, each block within the flowcharts represents both the method step and an apparatus element for performing the method step. Herein, the apparatus element may be referred to as a means for, an element for, or a unit for performing the method step. As to the block diagrams, it should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 1:
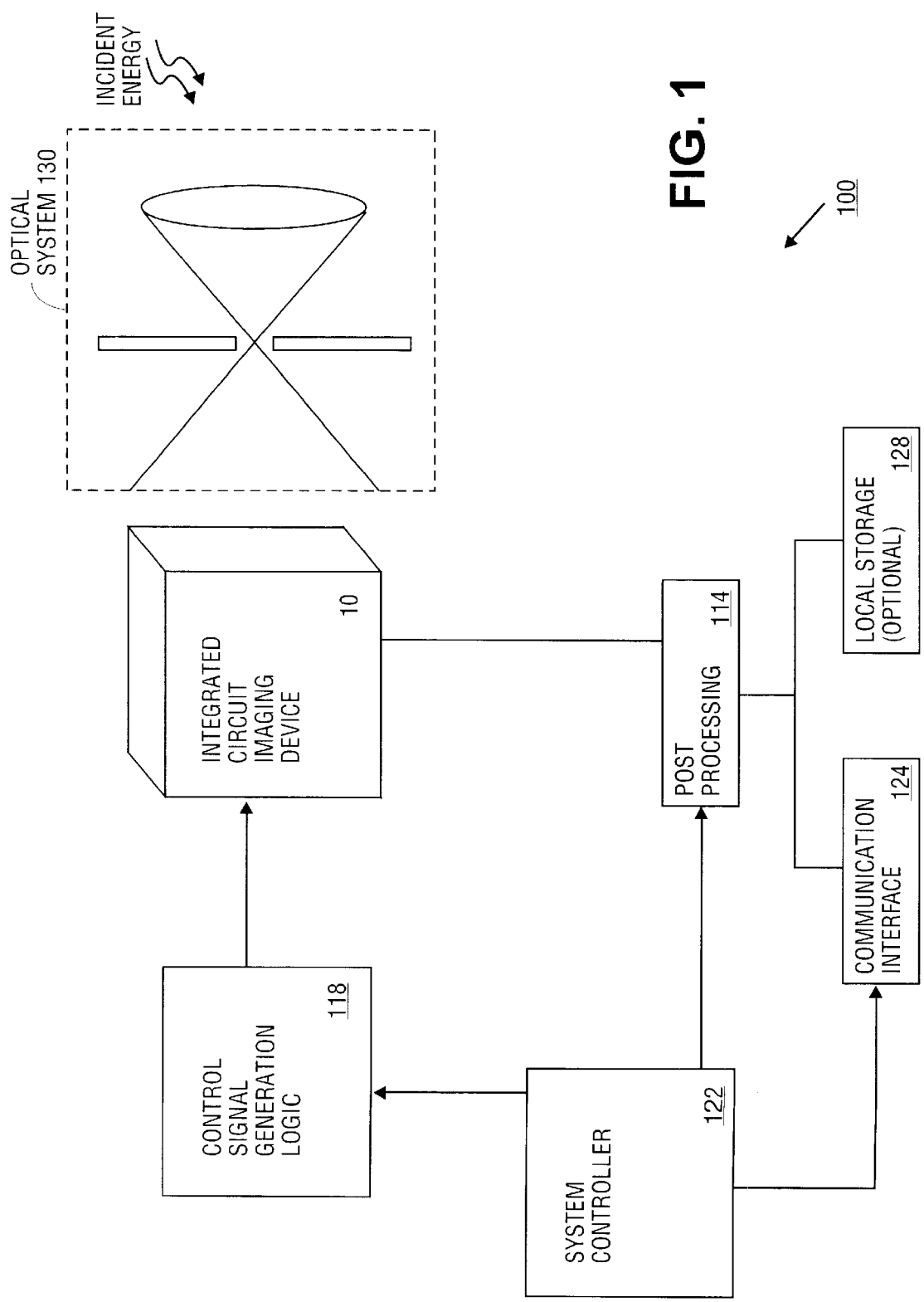
FIG. 1 is a block diagram illustrating an imaging system configured in accordance with an exemplary embodiment of the invention.

FIG. 1 is a block diagram of an imaging system 100 configured in accordance with one embodiment of the present invention. Imaging system 100 has an optical system 130 that channels the incident light to create an optical image on an integrated circuit imaging device 10. Control signal generation logic 118 is provided to generate the signals needed to communicate with integrated circuit imaging device 10. The output signals from integrated circuit imaging device 10 may be further processed by a post-processing block 114. The post-processing may include hardwired logic and/or a programmed processor that performs a variety of functions, including preparing digital image data based on the sensor signals for storage or transmission.

Transmission of the image data to an external processing system may be accomplished using communication interface 124. For instance, as a digital camera, the system 100 will contain a communication interface that implements a computer peripheral bus standard such as universal serial bus (USB) or Institute of Electronic and Electrical Engineers (IEEE) 1394 specification (1995). Imaging system 100 may also contain local storage 128 of the non-volatile variety, for instance including a solid state memory such as a removable memory card, a rotating magnetic disk device, or other suitable memory device for permanent storage of digital image data. The operation of system 100 may be orchestrated by a system controller 122 which may include a conventional microcontroller responding to instructions stored as firmware.

Figure 2:
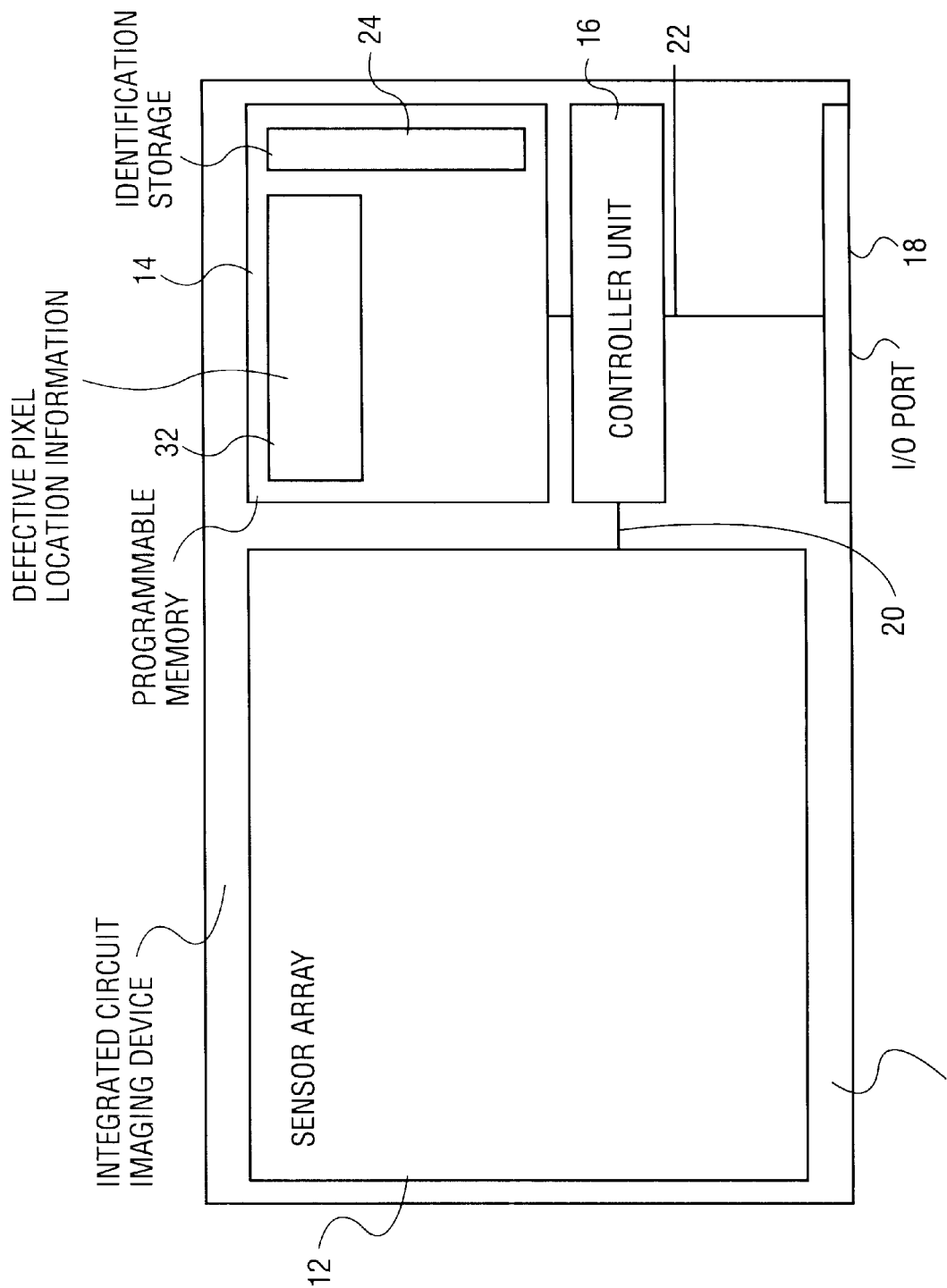
FIG. 2 is a block diagram illustrating a CMOS integrated circuit imaging device contained in the imaging system of FIG. 1 configured in accordance with an exemplary embodiment of the invention.

FIG. 2 illustrates integrated circuit imaging device 10 formed from a CMOS process on a single chip having an image sensor array 12, a programmable memory 14, a controller unit 16 and an input/output (I/O) port 18. Sensor array 12 includes a grid of individual CMOS light sensing elements configured to output analog signals representative of an amount of light intensity illuminating the elements to controller 16 along an analog signal connection bus 20. Depending upon the configuration, analog signals from elements of array 12 may be output simultaneously in parallel, output one at a time in series, or output row-by-row or column-by-column, etc. Controller unit 16 includes analog-to-digital (A/D) circuitry, not separately shown, for converting analog signals received from sensor array 12 to digital signals. In addition, controller unit 16 contains circuitry for programming programmable memory 14 and circuitry used for operating on the output of the digital signals. The digital signals are routed along a digital bus line 22 to digital I/O port 18 for output. Controller unit 16, depending upon the configuration, can perform one of a wide variety of image processing operations including, for example, pattern recognition operations, filtering operations, Fourier transform operations, and the like.

Resulting digital signals are output from circuit 10 through digital I/O port 18. Depending upon the implementation, the content and format of the digital output signals may differ. For many applications, it may be desirable to output an entire input image, perhaps filtered, in digital form. In other words, one digital value is output for each corresponding element of sensor array 12. In other implementations, it may be desirable to output only digital values resulting from operations performed by the logic circuit on the image detected by array 12. For example, for a pattern recognition application, it may be desirable to output signals identifying whether a particular pattern is recognized or not. In still other applications, it may be desirable to output compressed versions of the detected image. For example, although sensor array 12 may provide a 1024-by-1024 array of elements, controller unit 16 may output digital values corresponding to only a 512-by-512, compressed or reduced, array. As can be appreciated, a wide range of digital output signals and formats may be employed corresponding to a wide range of functions or operations that may be performed by controller unit 16. For most applications, controller unit 16 is preconfigured to perform only one particular operation on the detected image. In other embodiments, however, controller unit 16 may be configured to perform one of several operations with the particular operation being selected by an input signal received from I/O port 18.

Programmable memory 14, in the exemplary embodiment, is a flash programmable memory. The flash programmable memory used is preferably a CMOS-process compatible flash memory technology. In other embodiments, programmable memory 14 is a fuse programmable memory or any non-volatile programmable memory. The use of flash memory technology allows the reprogramming of programmable memory 14, while the use of fuse programmable memory does not. Both types of programmable memory can be used, depending on the implementation. Also, other programmable memory technologies can be used, depending on the required application, as described below.

Programmable memory 14 includes an array of individual memory locations for storing security/identification values for sensor array 12. When sensor array 12 is assigned with an identification number, programmable memory 14 uses an identification storage 24 for storing identification values. Depending upon the implementation, each identification value may be 16 bits, 32 bits, etc. The choice of the number of bits for each identification value depends upon the desired level of security.

One or more identification values can be stored in programmable memory 14. This allows the sensor to be used in different applications without having to be updated with different identification numbers. For example, if one system uses a 32 bit identifier for integrated chip 10, and another system uses a 64 bit identifier, then programmable memory array 14 would contain both the 32 bit identifier and the 64 bit identifier.

In use, sensor array 12 is exposed to the scene the user wishes to capture. Signals generated by the sensor element are transmitted to controller 16. Controller unit 16 will perform the analog-to-digital conversion on the analog signals received from sensor array 12 along with any necessary signal processing needed. In one embodiment, controller 16 embeds security/identification values in the digital pixel values to be output to I/O port 18.

Depending on the implementation requirements, controller unit can either sign each row of digital image data or each complete image data that is output on I/O port 18. In the former implementation, each row of digital image data undergoes a flash function along the security/identification value retrieved from identification storage 24. The receiver of the output from I/O port 18 checks the attached signature of the image data to verify that the signal is generated from integrated circuit imaging device 10. In the latter approach, the receiver only has to process each frame of digital data to be sure that end frame is authentic.

By signing the digital data, the output from I/O port 18 can be identified to be from integrated circuit imaging device 10. In addition, the accuracy or validity of the digital data from integrated circuit imaging device 10 can be verified at the same time. It is to be noted that additional processing on the image data can be performed by post processing circuitry if the signature of integrated circuit imaging device 10 is removed before the image is processed, and resigned using the signature of the post processing circuitry.

For example, the post-processing circuitry can remove the signature of integrated circuit imaging device 10, process the image data, and then resign the image data using the signature of the post-processing circuitry. The post-processing circuit signs not only the image data, but the signature of integrated circuit imaging device 10. Thus, the image data and the signature of integrated circuit imaging device 10 are encapsulated in the set of data signed by the post-processing circuitry. By adding additional signatures, a trail of recipients of the image data is maintained. In an alternate embodiment, only the security or identification value of integrated circuit imaging device 10 is re-transmitted.

The digital data produced by integrated circuit imaging device 10 can also be encrypted. To do so, programmable memory 14 needs to store the public key of the user so that only the user, using the private key of the user, can decrypt the image data.

Controller 16 uses the security/identification values from programmable memory 14 for the security operations of the image data received from sensor array 12.

Figure 3:
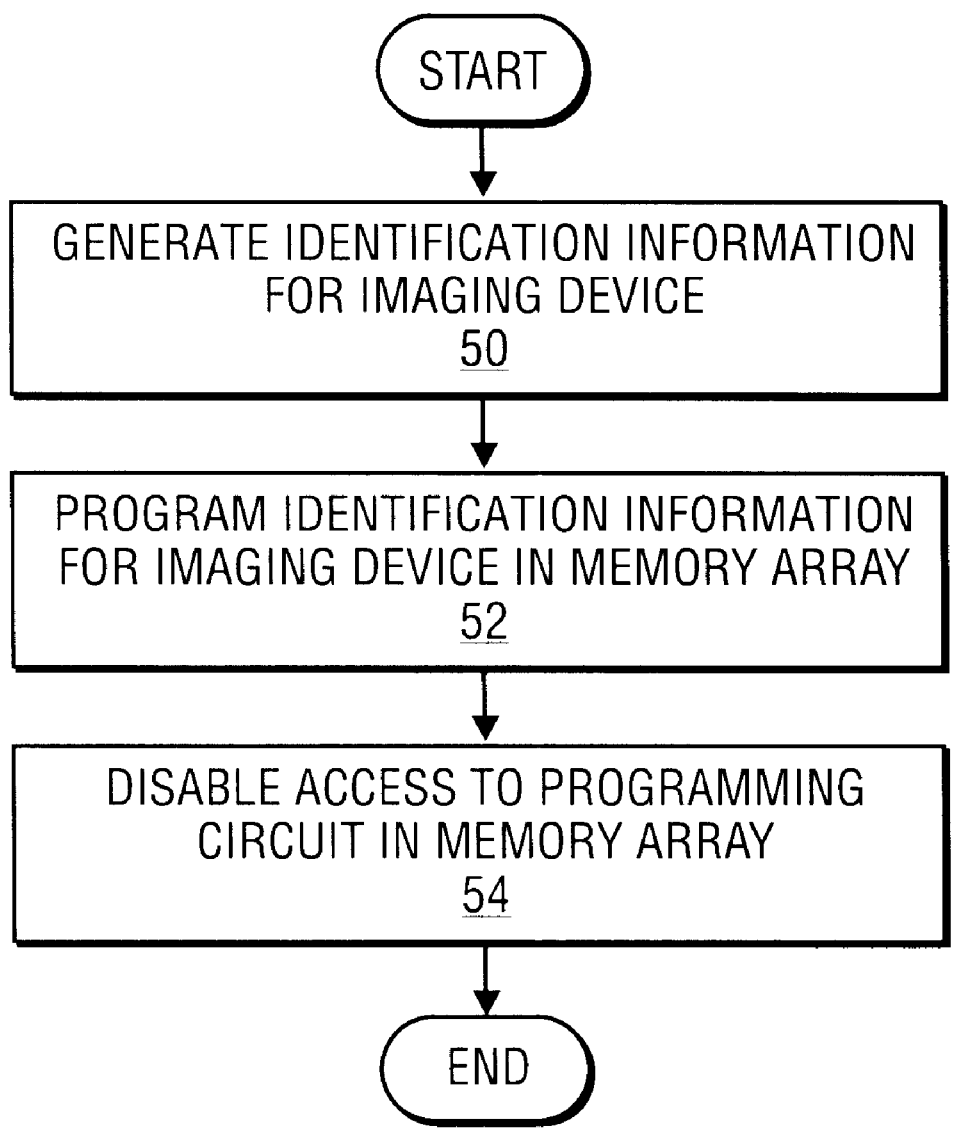
FIG. 3 is a flowchart illustrating a method for configuring the integrated circuit imaging device of FIG. 2 for security/identification purposes.

FIG. 3 is a flowchart summarizing the above-described method for configuring integrated circuit imaging device 10 for security/identification purposes. Initially, at step 50, as each integrated circuit imaging device is manufactured, such as being identified on a wafer as being a usable integrated circuit device, an identification/security value is generated for the integrated circuit imaging device. For example, after integrated circuit imaging device 10 has been identified as an operable integrated circuit device, an identification/security value will be generated for storage onto integrated circuit imaging device 10. Identification/security information is reserved for integrated circuit imaging devices only after they are determined to be usable so that identification/security values can be saved and not wasted on inoperable devices. However, in another embodiment, an identification/security value can be assigned to each integrated circuit imaging device even before they are tested for operability as this will allow all manufactured integrated circuit imaging devices to be tracked, whether or not they are usable. The latter embodiment allows statistical data to be collected on manufacturing the actual devices. It will allow detailed records to be kept on manufacturing defects occurrences, and thereby allowing the manufacturing process to be improved. Operation then continues with step 52.

In step 52, all operable integrated circuit imaging device (or, in the second embodiment, all integrated circuit imaging devices), are programmed with an identification/security value assigned in step 50. As described in FIG. 2, the identification/security information is stored in identification storage location 24 in programmable memory 14. As described above, programmable memory 14 is a flash programmable memory in the exemplary embodiment. Thus, the flash memory would be flash programmed, perhaps using hot-electron injection techniques. Such programming can be in accordance with conventional techniques. Programmable memory 14 can also be a fuse-programmable memory, in which case, the identification/security information would be programmed in programmable memory 14 by blowing the appropriate fuse links in the fuse programmable memory.

In step 54, access to the programming circuit for programmable memory 14 is disabled such that the identification/security values, which are stored in identification storage 24 of programmable memory 14, can never by changed. In one approach, only the portion of programmable memory 14, which is reserved for identification storage 24, would need to be protected from further modification. Therefore, only that portion of programmable memory 14 would need to be in inaccessible from future programming. If programmable memory 14 is to be used to only store identification/security values (i.e., identification storage 24 is the only use of programmable memory 14), then all of programmable memory 14 would be made inaccessible for programming after the identification/security values have been stored. In yet another embodiment, integrated circuit imaging device 10 can be made to store one unique unchangeable identification value, which would only require that access to that portion of programmable memory 14 would be prevented. To prevent the reprogramming of programmable memory 14, the appropriate signal lines of programmable memory 14 are not bonded out to the pins on the packaging of integrated circuit imaging device 10. After the identification/security values are stored in identification storage 24, and access to the appropriate programming circuits in programmable memory 14 are disabled, the integrated circuit imaging device can be operated on by other manufacturing processes.

Figure 4:
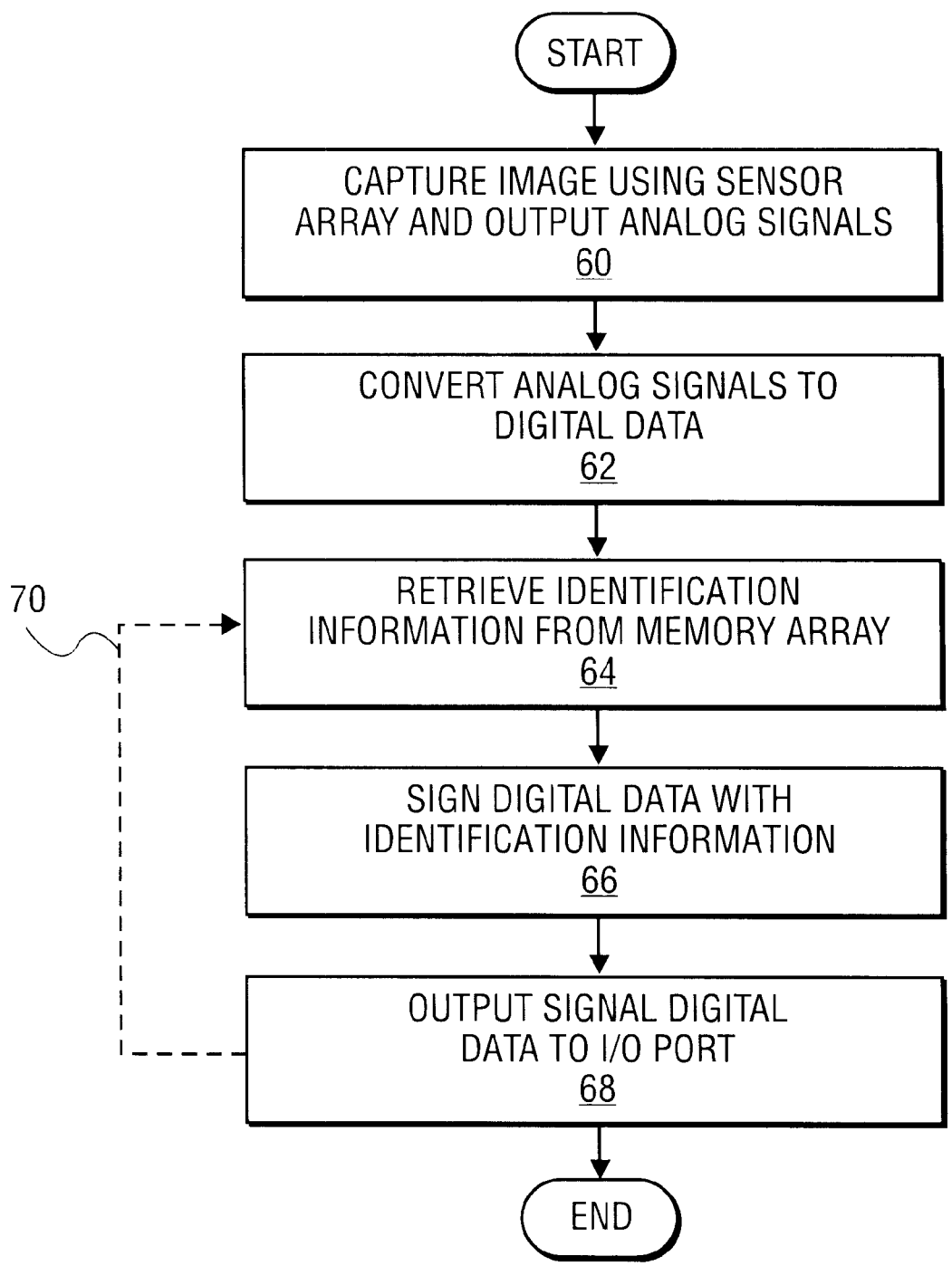
FIG. 4 is a flowchart illustrating a method for operating integrated circuit imaging device of FIG. 2 in capturing an image and image integrity information.

FIG. 4 is a flowchart summarizing the above-described method for operating integrated circuit imaging device 10 in capturing an image and associating the identification/security values associated with integrated circuit imaging device 10 with the captured image. Initially, in step 60, sensor array 12 of integrated circuit imaging device 10 is allowed to store charge to be able to capture an image to which it is exposed. Sensor array 12 will output analog signals over analog signal connection bus 20 to controller unit 16. Thereafter, in step 62, controller unit 16 converts the analog signals received from sensor array 12 to digital data. In one embodiment, the digital data is compressed in accordance with conventional techniques to limit the amount of space they require for transmission. Operation then continues with step 64.

In step 64, control unit 16 retrieves the identification/security values from identification storage 24 by accessing programmable memory 14. As described above, multiple identification/security values can be stored in identification storage 24. Thus, control unit 16 can retrieve one or several of these identification/security values as necessary as described below. In step 66, control unit 16 will sign the digital data control unit 16 converted from analog signals in step 62 with the retrieved identification/security values retrieved in step 64. The digital data is signed in accordance with conventional techniques. For example, if the identification/security value stored in identification storage 24 is the private key of integrated circuit imaging device 10, then the digital data would be signed with the private key of integrated circuit imaging device 10. In one embodiment, each row of the analog signals output from sensor array 12 is converted to digital data and signed with the identification/security value of integrated circuit imaging device 10. In alternate embodiments, control unit 16 waits until the digital data for the analog signals retrieved from all rows of sensor array 12 is converted to digital data before control unit 16 signs the digital data with the identification/security values of integrated circuit imaging device 10. After the digital data has been signed by controller 16, operation would then continue with step 68 where the signed digital data is output to I/O port 18 of integrated circuit imaging device 10 to the post-processing circuits in the system. If, as described above, each row of sensor array 12 is signed independently of the other rows, then operation will continue from step 68 to step 64 as shown by dotted line 70. In addition, if each frame (i.e., all analog signals captured from sensor array 12) are to be signed at once, and multiple frames were to be captured, then operation would also return to step 64 from step 68 such that each frame is signed individually.

Referring again to FIG. 1, thus far, an integrated circuit has been described wherein a portion of the circuit is employed as memory for storing security/identification values. Additionally, however, other portions of the circuit may be employed as memory for storing other values as well. Portions of programmable memory 14 may be employed for storing configuration values, perhaps directed towards particular applications. For example, if the integrated circuit is intended for use within a video camera, then certain configuration values that can be used to modify the output of each pixel, which are useful in such an application, are stored within the programmable memory. On the other hand, if the integrated circuit is intended for use within a medical imaging device, then alternative configuration values are stored. As can be appreciated, a wide range of values may be flash programmed to facilitate a wide range of applications.

Referring again to FIG. 2, programmable memory 14 includes a storage location for defective pixel location information 32. In a preferred embodiment, defective pixel location information 32 contains a table of the coordinates of the defective pixels located in sensor array 12. As described below, sensor array 12 is tested during manufacture to determine the defective pixels located therein, so as to determine the location of all defective pixels located in sensor array 12.

Figure 5:
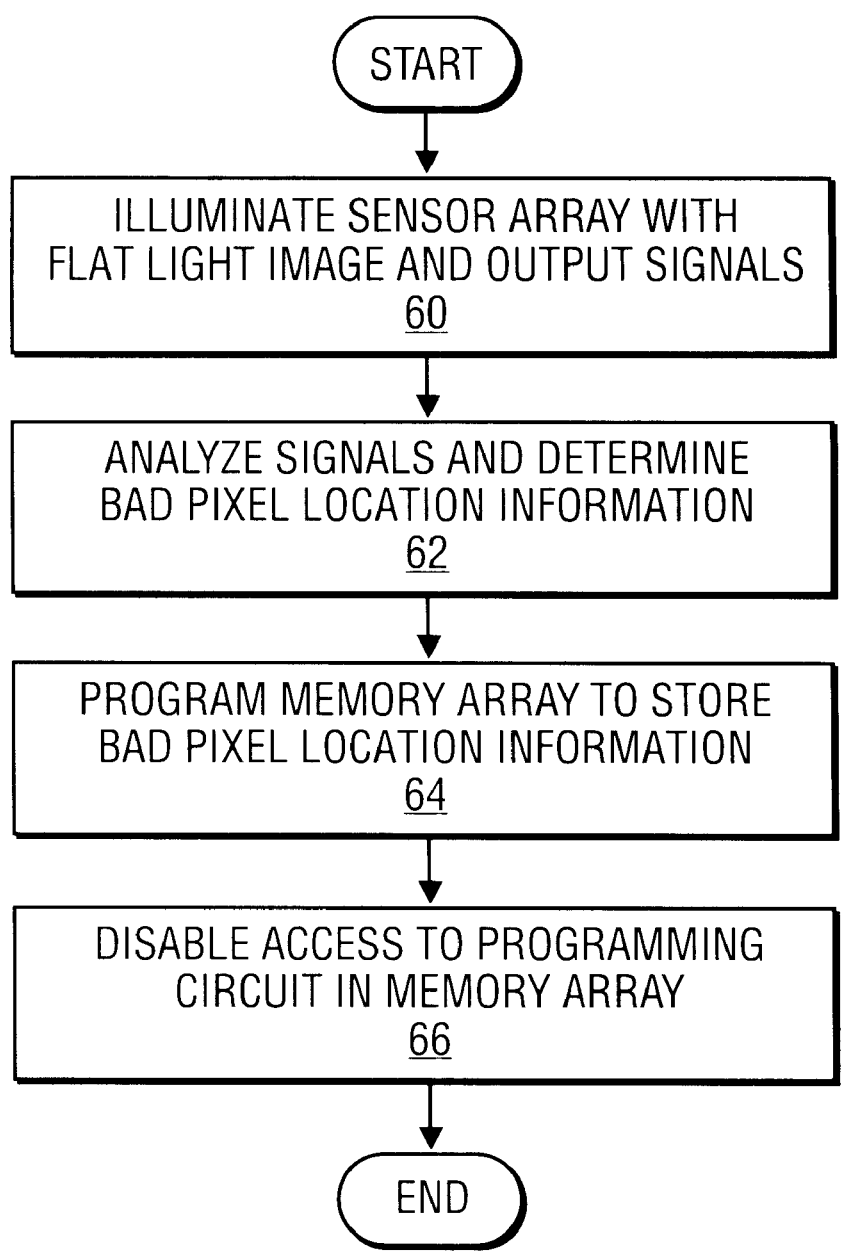
FIG. 5 is a flowchart illustrating a method for configuring integrated circuit imaging device of FIG. 2 to program and store defective pixel location information.

FIG. 5 is a flow chart summarizing the above-attached described method for operating integrated circuit imaging device 10 to program and store defective pixel location information for sensor array 12. In step 60, sensor array 12 of integrated circuit imaging device 10 is illuminated by a flat image (i.e., an image with no variation in the light intensity or color). Sensor array 12, when it receives the illumination, will output analog signals over analog signal bus 20 to control unit 16. Next, at step 62, control unit 16 will receive the analog signals from sensor array 12 and analyze them to determine that pixel location information. In one exemplary process, the image will be of sufficient intensity to cause all pixels in sensor array 12 to become saturated after a predetermined period. Control unit 16 will then analyze received analog signals and determine if any of the received analog signals are not saturated such that control unit 16 can determine whether each particular pixel in sensor array 12 is operable. Thus, for a completely white image, control unit 16 will note the location of each pixel that outputs zero value (i.e., control unit 16 will note each pixel in sensor array 12 that does not detect an image and therefore is non-operable). In another process, sensor array 12 is exposed to a completely black image (i.e., sensor array 12 is kept in a completely dark environment); and control unit 16 will determine if any pixels in sensor array 12 outputs a light detected signal, which represents that the sensor is falsely detecting a light source. After all locations of defective pixels have been determined through the use of control unit 16 and other testing equipment, operation then continues with step 64.

In step 64, programmable memory 14 is used to store defective pixel location information determined in step 62. This information is stored in defective pixel location information storage area 32 of programmable memory 14. In one embodiment, the defective pixel coordinates are stored in a table format. In another embodiment, the defective pixel location information is compressed to save storage space in programmable memory 14.

Programmable memory 14 can be programmed in a variety of methods, depending on the actual physical structure of the programmable memory. For example, if programmable memory 14 is a flash programmable memory, then programmable memory 14 may be programmed by applicable standard flash programming techniques. Alternatively, if programmable memory 14 is a fuse-programmable memory, then programmable memory 14 may be programmed by opening the appropriate fuses in programmable memory 14.

Figure 6:
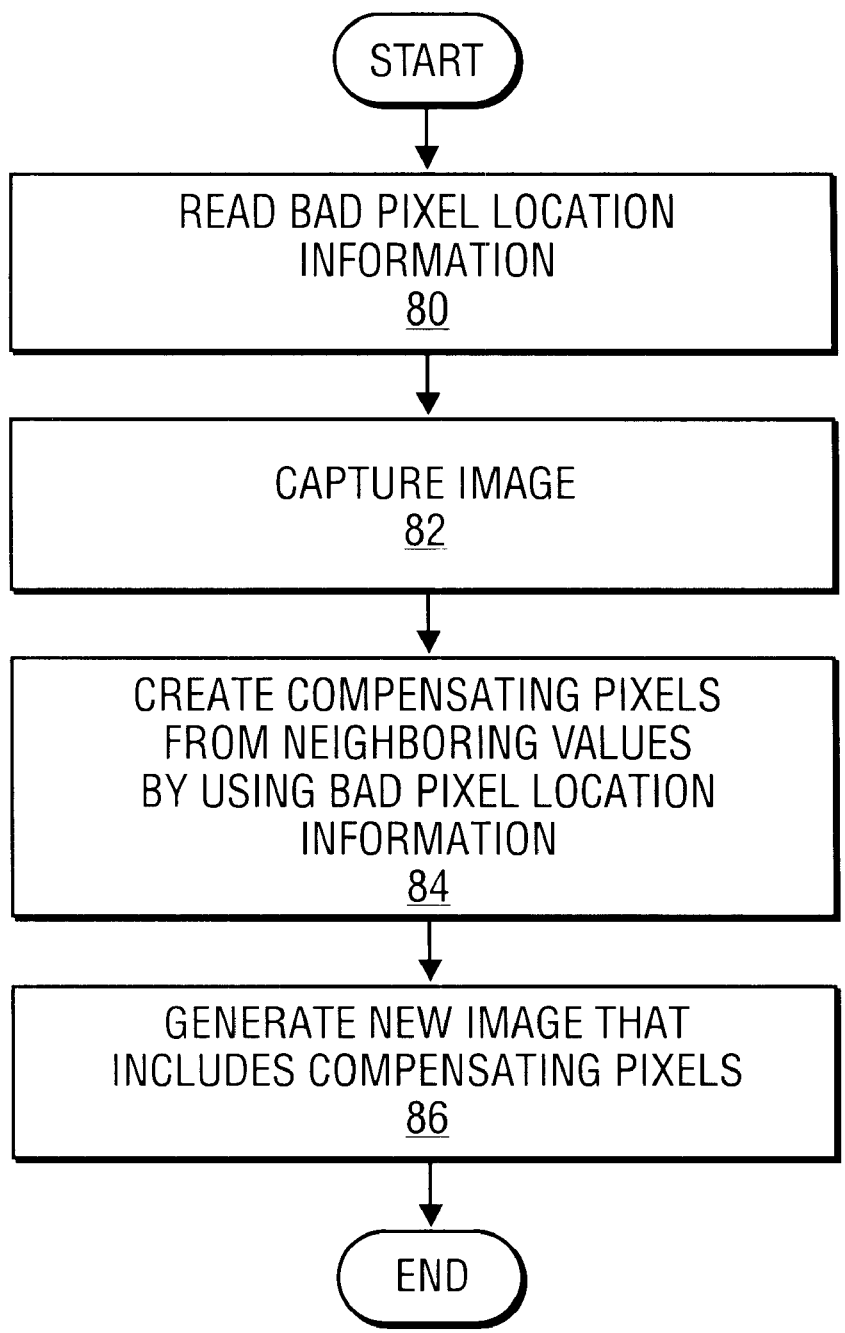
FIG. 6 is a flowchart summarizing a method of operating integrated circuit imaging device of FIG. 2 in capturing an image and providing defective pixel correction.

FIG. 6 is a flowchart summarizing a method of operating integrated circuit imaging device 10 in capturing an image and providing defective pixel correction. Initially, in step 80, system controller 122 accesses defective pixel location information 32 to read out the stored coordinates of the defective pixels in sensor array 12. As described above, the coordinates are store in a tabular format. In one embodiment, the information is compressed to save space in programmable memory 14. Thus, the information must be decompressed when it is retrieved from programmable memory 14. After the information is retrieved and decompressed, operation will continue with step 82.

In step 82, system controller 122 causes integrated circuit imaging device 10 to capture an image. Controller unit 16 first initiates sensor array 12 by resetting sensor array 12, Controller unit 16 then reads out the captured analog signals from sensor array 12 before outputting the digital signals that are converted from the analog signals on I/O port 18.

In step 84, compensation pixel values are generated to replace the missing data from the defective pixels in sensor array 12. In one preferred embodiment, the compensation pixel values are generated by examining the pixel values of the pixels surrounding the defective pixels. Thus, the pixel values of each surrounding pixels of a defective pixel are averaged to arrive at a compensation pixel value. In another embodiment, the pixel value of a pixel that precedes the defective pixel is used as the compensation pixel value.

In step 86, a new image is created with the appropriate compensation pixel values in the locations where the respective defective pixels are located. In an alternate embodiment, a separate list having the compensation pixel values are sent along with the uncorrected image to allow the use of other defective pixel correction processes.

What has been described are various embodiments of an integrated circuit CMOS imaging detection device having all necessary components integrated onto a single circuit rather than provided on several separate chips. Identification/security applications for the integrated circuit is achieved by programming portions of the integrated circuit. In one arrangement, a flash memory is provided for storing identification/security values. In another arrangement, fuse-programmable memory is used to store identification/security values. Other arrangements are also possible consistent with the general principles of the invention.

Also although described primarily with respect to an integrated circuit having a 2-dimensional sensor array, other sensor configurations are possible. The exemplary embodiments described herein are intended merely to illustrate principles of the invention and should not be construed as limiting the scope of the invention.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An imaging system comprising:

a complementary metal oxide semiconductor (CMOS) integrated circuit (IC) imaging chip having an on-chip image sensor array and a plurality of on-chip MOS sensor pixel circuits to provide signals representative of light incident upon the sensor array, a programmable non-volatile memory located on the IC chip to store defective pixel location information, a controller unit located on the IC chip and coupled to access the defective pixel location information in the programmable non-volatile memory, generate a plurality of compensating pixel values from neighboring pixel values of a plurality of defective pixels, and to generate a digital image by digitizing the signals provided by the sensor array;

an optical system to channel said light and create an optical image on the sensor array of the IC imaging chip; and a communication interface coupled to the controller unit wherein the communication interface implements a computer peripheral bus standard for a serial bus.

2. The imaging system of claim 1 further comprising a non-volatile removable storage device to store a plurality of digital images generated by the controller unit.

3. The imaging system of claim 1 wherein the programmable non-volatile memory is a flash memory.

4. The imaging system of claim 1 wherein the controller unit is to further detect said defective pixel location information based on the signals provided by the image sensor array, and then to program the programmable non-volatile memory with said defective pixel location information.

5. The imaging system of claim 4 wherein the controller unit is to include said plurality of compensating pixel values in locations of the digital image that correspond to said plurality of defective pixels.

6. The imaging system of claim 4 wherein the controller is to provide a list of said plurality of compensating pixel values separate from said digital image that contains locations corresponding to said plurality of defective pixels.

* * * * *